Aug. 2, 1955     W. J. FASO     2,714,515
EXTENSION CHUCK FOR TWIST DRILLS
Filed June 29, 1953
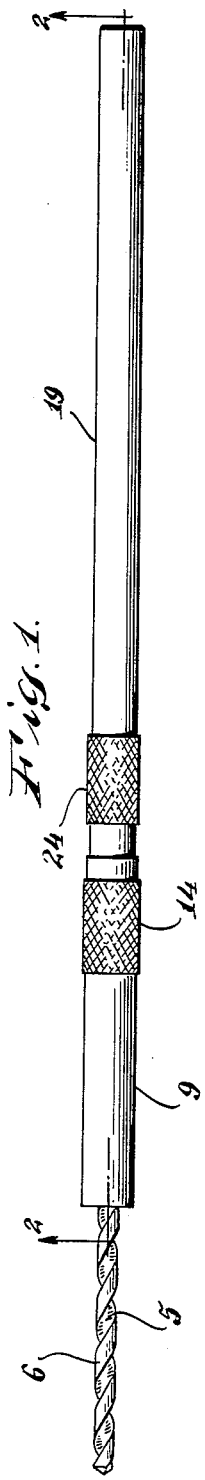
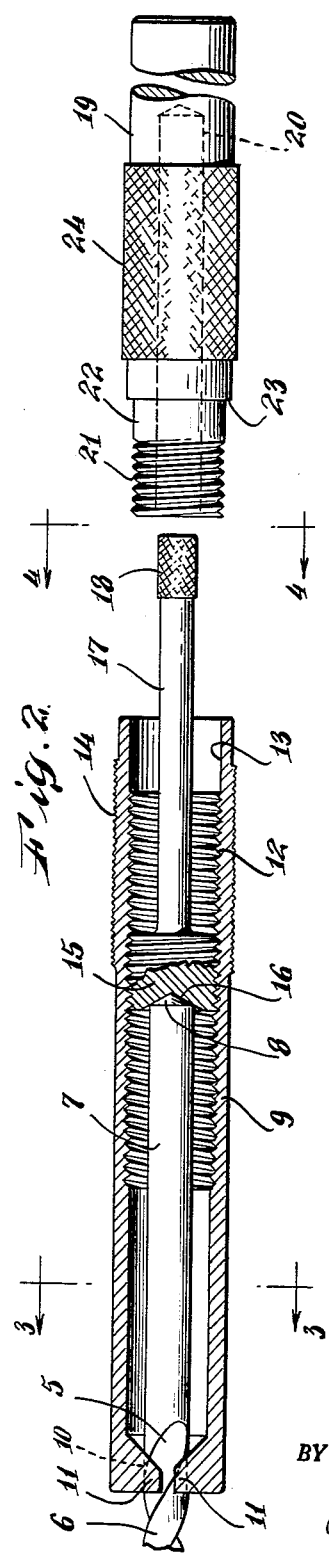
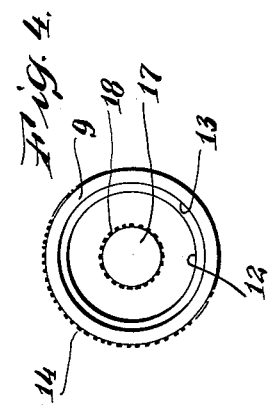
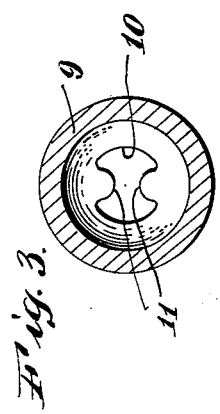
INVENTOR.
W. J. Faso
BY
John A. Seifert
ATTORNEY.

United States Patent Office 2,714,515
Patented Aug. 2, 1955

2,714,515

EXTENSION CHUCK FOR TWIST DRILLS

William J. Faso, Huntington Station, N. Y.

Application June 29, 1953, Serial No. 364,607

4 Claims. (Cl. 279—89)

This invention relates to extension chucks for twist drills, reamers, taps and the like.

It is an object of the invention to provide a combination of twist drill or reamer or tap and the like, chuck member and extension rod wherein the parts of the combination are assembled without soldering or brazing and are readily taken apart to replace the twist drill, or reamer, or tap and the like.

It is another object of the invention to assemble the twist drill or reamer or tap and the like, and the chuck member to be stored for future use.

It is a further object of the invention to provide a combination of chuck member and extension rod whereby one extension rod is usable with a greater number of chuck members holding twist drills or reamers or taps and the like of different sizes.

Other objects and advantages of the invention will be set forth in the detailed description of the invention.

The drawing accompanying and forming a part of this application comprises;

Figure 1 showing the assembled twist drill, chuck member and extension rod;

Figure 2 showing a longitudinal-sectional view, on an enlarged scale, taken on the line 2—2 of Figure 1 looking in the direction of the arrows;

Figure 3 showing a cross-sectional view taken on the line 3—3 of Figure 2 looking in the direction of the arrows; and Figure 4 showing an end view of the chuck member looking from the line 4—4 of Figure 2 in the direction of the arrows.

The invention is particularly adapted for use with a twist drill having spiral flutes 5 and spiral blades 6 at one end portion and a smooth shank portion 7 at the opposite end, as shown in Figure 2. The end of the shank portion 7 is of conical shape, as shown at 8 in Figure 2. The twist drill is removably mounted in a chuck member comprising a tubular member 9 having an internal diameter or bore substantially larger than the diameter of the twist drill. One end of the tubular member 9 is arranged with an opening 10 of a diameter to form a sliding fit with the spiral blades 6 of the twist drill and having diametrically opposed projections 11 of arcuate or curved configuration extending into the opening to form a sliding fit with the spiral flutes 5 of the twist drill, as shown in Figures 2 and 3. The number and position of the projections 11 may be varied corresponding to the tool being used. An intermediate portion of the bore of the tubular member 9 is provided with screw threads 12 spaced a greater distance from the opening 10 and projections 11 than from the opposite end of the tubular member 9. The portion of the bore between the screw threads 12 and said opposite end of the tubular member 9 is of enlarged diameter, as shown at 13 in Figures 2 and 4. To facilitate handling of the chuck member, the outer surface of the tubular member 9 is knurled, as at 14, at the end portion arranged with the enlarged bore portion 13.

The twist drill is assembled in the tubular member 9 by inserting the twist drill with the spiral flutes 5 and spiral blades 6 foremost into the enlarged diameter bore portion 13 and engaging the spiral flutes 5 and spiral blades 6 with the projections 11 and opening 10, respectively. The forward movement of the twist drill is arrested by the shank portion 7 abutting the projections 11, as shown in Figure 2. The twist drill is retained in the tubular member 9 with the spiral flutes 5 and spiral blades 6 extending from the tubular member 9 and the shank portion 7 abutting the projections 11. This is accomplished by a locking member in the form of a screw threaded plug 15 adjustably engaged with the screw threads 12 of the tubular member 9. One end of the plug 15 is arranged with a conical recess 16 to engage the conical end 8 of the twist drill and center the twist drill in the bore of the tubular member 9. The opposite end of the plug 15 is provided with a stem 17 of a length to project from the enlarged bore end 13 of the tubular member 9 when the conical recess 16 abuts the conical end 8, as shown in Figure 2. To facilitate manipulation of the plug 15, the end of the stem 17 is knurled, as at 18 in Figures 2 and 4. When the plug 15 is secured in position to hold the shank portion 7 against the projections 11, the projections 11 engaging the spiral flutes 5 will prevent turning of the drill in the chuck member during drilling operation.

The assembled twist drill and chuck member may be stored until required, and they are operatively connected to driving mechanism, not shown, by an extension rod 19 having an axial elongated recess 20 extending into an end portion externally reduced and arranged with screw threads 21 and smooth at 22. The screw threads 21 adjustably engage the screw threads 12 encircling the stem 17 and the smooth portion 22 has a sliding fit with the enlarged end portion 13 to guide the screw threads 21 into engagement with the screw threads 12 in conjunction with the engagement of the stem 17 in the recess 20. The junction between the reduced end portion 22 and the body of the rod 19 forms a shoulder 23 to abut the end of the chuck member and limit movement of the extension rod 19 into the chuck member 9. Adjacent to the shoulder 23, the rod 19 is knurled at 24 to facilitate tightening of the extension rod 19 in the chuck member 9 in conjunction with the knurl 14 on the chuck member. The driving rotation of the rod 19 will tighten the connection between said rod and the chuck member 9.

The extension rod 19 can be connected to one of a great number of chuck members for holding different size drills. In actual use, one extension rod can be used with chuck members for holding over fifty drill sizes.

Having thus described my invention, I claim:

1. In an extension drill chuck, a twist drill having spiral flutes and spiral blades at one end portion and a shank portion at the opposite end, a tubular chuck member having an opening forming a sliding fit with the blades of the drill and arranged with projections extending into the opening and engaging the spiral flutes of the drill and abutting the drill shank portion to limit outward movement of the drill through said opening, a locking member adjustably mounted in an intermediate portion of the bore of the chuck member and having a stem of less diameter than the bore of the chuck member extending from one end of the locking member concentrically of the bore of the chuck member and adapted to project from the end of the chuck member opposite the end arranged with the projections with the opposite end of the locking member abutting one end of the drill shank portion and retaining the other end of the drill shank portion against the projections of the chuck member, and an extension rod having one end portion arranged to be engaged in the chuck bore, said end portion of the extension rod having an elongated recess therein to engage the projecting end of the stem of the locking member and said end portion of the extension rod having the elongated recess therein removably connected to an intermediate portion of the chuck bore between the locking member and the end of the chuck member opposite the end arranged with the projections, the engagement of the stem of the locking member with the elongated recess guiding said end of the extension rod into the chuck bore.

2. An extension drill chuck as claimed in claim 1, wherein the end portion of the bore of the chuck member opposite the end arranged with the projections is of enlarged diameter, and the extension rod is arranged with a cylindrical portion adjacent the end portion removably connected to the intermediate portion of the chuck bore and said cylindrical portion having a sliding fit with said enlarged diameter bore portion.

3. An extension drill chuck as claimed in claim 1, wherein an intermediate portion of the bore of the chuck member is arranged with screw threads, the locking member is provided with external screw threads for adjustable engagement with the screw threads of the bore of the chuck member, and the end portion of the extension rod removably connected to an intermediate portion of the bore of the chuck member is arranged with screw threads to engage the screw threads of the bore of the chuck member between the locking member engaging said screw threads of the bore of the chuck member and the end of the chuck member opposite the end arranged with the projections.

4. An extension drill chuck as claimed in claim 1, wherein an intermediate portion of the bore of the chuck member is arranged with screw threads and an end portion of the bore of the chuck member opposite the end arranged with the projections is of enlarged diameter, and the end portion of the extension rod having the elongated recess is provided with screw threads at the extremity to engage the screw threads of the bore of the chuck member, a smooth cylindrical portion adjacent the screw threads of the extension rod to have a sliding fit with the enlarged diameter end portion of the bore of the chuck member and a shoulder between said smooth cylindrical portion and the body of the extension rod abutting the end edge of the chuck member and limiting the movement of the extension rod into the bore of the bore of the chuck member.

References Cited in the file of this patent

UNITED STATES PATENTS

| | | |
|---|---|---|
| 206,606 | Crockford | July 16, 1878 |
| 1,475,514 | Ross | Nov. 27, 1923 |
| 2,365,810 | Faso | Apr. 5, 1944 |
| 2,451,922 | Cox | Oct. 19, 1948 |